(12) United States Patent
Levenshteyn et al.

(10) Patent No.: US 9,111,108 B2
(45) Date of Patent: Aug. 18, 2015

(54) SYSTEM, METHOD AND PROGRAM FOR CONTROLLING ACCESS RIGHTS

(75) Inventors: Roman Levenshteyn, Aachen (DE); Ioannis Fikouras, Stockholm (SE); Konstantinos Vandikas, Solna (SE); Patrik Wiss, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1477 days.

(21) Appl. No.: 12/249,313

(22) Filed: Oct. 10, 2008

(65) Prior Publication Data

US 2010/0095373 A1    Apr. 15, 2010

Related U.S. Application Data

(60) Provisional application No. 61/031,056, filed on Feb. 25, 2008.

(51) Int. Cl.
*G06F 21/00* (2013.01)
*G06F 21/62* (2013.01)

(52) U.S. Cl.
CPC .......... *G06F 21/6218* (2013.01); *G06F 21/629* (2013.01)

(58) Field of Classification Search
USPC ............................. 726/4, 21, 27, 1, 26, 28, 30
See application file for complete search history.

(56) References Cited

U.S. PATENT DOCUMENTS

| | | | |
|---|---|---|---|
| 6,188,995 B1* | 2/2001 | Garst et al. ...................... 705/59 |
| 2006/0095276 A1* | 5/2006 | Axelrod et al. .................... 705/1 |
| 2008/0086701 A1* | 4/2008 | Stokes et al. .................. 715/808 |
| 2008/0256507 A1* | 10/2008 | Chaar et al. ................... 717/101 |
| 2010/0058197 A1* | 3/2010 | Chee et al. .................... 715/751 |

OTHER PUBLICATIONS

Mayer, F et al. Chapter 1—SELinux by Example. 2007.

* cited by examiner

*Primary Examiner* — Edward Zee

(57) ABSTRACT

A system for controlling access rights of a software developer party with respect to artifacts having computer operated functions of a computer program includes an access control database which has policies that control access by a party to the artifacts in an application development environment. The system includes an application development environment having the artifacts. The system includes an access policy controller in communication with the access control database and the application development environment which implements the policies and controls access by the party to the artifacts being controlled. At least a first of the plurality of artifacts has a part being modifiable by the party and operative with all other artifacts of the plurality of artifacts after being modified.

19 Claims, 3 Drawing Sheets

SYSTEM, METHOD AND PROGRAM FOR CONTROLLING ACCESS RIGHTS

FIELD OF THE INVENTION

The present invention is related to the control of access rights of artifacts having computer operated functions of a computer program. (As used herein, references to the "present invention" or "invention" relate to exemplary embodiments and not necessarily to every embodiment encompassed by the appended claims.) More specifically, the present invention is related to the control of access rights of artifacts having computer operated functions of a computer program where the access to the artifacts is based on a request of a party and policies in a database.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Due to the broad adoption of service-oriented architectures, tools for composition, orchestration and choreography of services are gaining in popularity. The most well-known example of such tools is the BPEL, manifested by various tools, and the Windows Workflow Foundation. There exist also other approaches. For the sake of simplicity, but without the loss of genericity, we will use the term "application skeleton" for referring to a description defining structural, behavioural, execution and other major aspects of composite services For example, BPEL script can be an example of such an application skeleton.

Some $3^{rd}$ party tools provide mechanisms for inspecting the source code and identifying any violations of a predefined coding style or certain coding guidelines. Most of these tools are based on the static analysis of the code, but there are also some tools that observe the dynamic behaviour of the code. Static tools are usually realized in form of a pre-processor that performs its checks, when being asked for it. AOP tool AspectJ is one example of the tool allowing for defining of such policies in form of aspects and controlling/altering the behaviour of Java compiler by their means.

Some systems use policies to control the execution of code. For example, Java Virtual Machines (JVM) use special policy files to control access to certain restricted APIs inside the code running on the given JVM.

Software developers often want to protect their programs from being copied (either physically or by borrowing the details of implementation) and/or executed without permission, since it would violate the license terms. There exist multiple mechanisms to protect the code:

Obfuscating the code

Providing the code only in the binary, compiled format, so that it is very difficult or impossible to restore the original source code from the binary form A set of well known mechanisms exists for controlling the actions that can be performed by the system based on an object being acted upon, party, type of action and other parameters. These mechanisms include different variations of Service Level Agreements (SLA) and subscriptions. It should be noted that user/party are used interchangeably herein and either refers to a party as a human being or another non-physical entity such as a program.

When creating new service compositions for e.g. very complex use-cases with non-trivial logic, it may be required to protect their source-code (or parts of it) from being accessed and/or modified by parties/customer, because it would preserve the know-how and/or also disallow any changes that make break the composition and lead to the unwanted and unexpected results. The last consideration is particularly important for the mission critical application, like those ones in the telecom domain, where telecom-grade stability is expected.

In the following text, without the loss of generality the term artifact denotes:

Basic entity being edited, controlled, transformed and executed by creation and execution environments Or set of parts, where each part is a basic entity as defined previously or another artifact An artifact may be an application skeleton, BPEL workflow definition, source code of the program or any other means of describing actions to be performed, structured document, etc.

Without loss of generality an Execution Engine is a system capable of performing certain computer functions based upon the actions definitions described by the artifact. The computer functions can also be performed based on other information, whether it be internally or externally derived, or both, if so desired.

Current service creation environments and IDE have certain built-in policies regarding the ability of the party to access/create/modify/execute of the artifacts being controlled by these tools. This approach based on the build-in policies makes sense for the usual situation, where the source code is being developed by the party of the tool and where all the functions of the tool should be available for this party.

However, in a situation, where such artifacts are distributed in their source code (e.g. application skeletons), there is a need to have a more fine-grained control over the set of operations that could be performed on the artifact.

For example, the creator/owner of a composition may want to disallow any modification of it (or certain parts of it) or even prevent the definition of artifact from being able to be seen (i.e. it may be not possible to read it, but it could be possible to execute it).

Another interesting use-case could be in a case, where the developer, depending on her developer subscription for the given composition or creation environment as a whole, is not allowed to use certain parts of the IDE (i.e. menus, wizards) or even is not allowed to use/modify certain constructs of the language being used to define new artifacts.

Finally vendors of a composite service may want to sell application skeletons while maintaining control over them, so that they may not be modified by customers. Specific parts of such compositions may be editable or executable under specific conditions defined by the vendor (e.g. availability of special licenses). The set of operations that a customer is allowed to perform on the skeleton (i.e. read, modify, execute, export, etc) should be dependent on the agreement between the vendor and the customer (e.g. SLA, license, etc).

The use-cases described above cannot be expressed using service creation environments available today. Such tools rely mostly on the operating system and obey strictly to the security features the file system has to offer; for example read/write/execute access or group policies. The currently known solution for the provisioning of a variety of access features over different artifacts is the distribution of the functionality over different files. However, this solution makes it very difficult for the publisher to maintain each function and potentially leads to loss of the know-how contained within the application skeleton.

BRIEF SUMMARY OF THE INVENTION

The present invention pertains to a system for controlling access rights of artifacts having computer operated functions of a computer program. The system comprises an application development environment having the artifacts. The system comprises an access control database which has policies that define access by a party to the artifacts in the application development environment. The system comprises an access policy controller in communication with the access control database and the application development environment which implements the policies and controls access by the party to the artifacts whose access is being controlled by the controller.

The present invention pertains to an apparatus for controlling access rights of artifacts having computer operated functions of a computer program. The apparatus comprises of an access control database which has policies that control access by a party to the artifacts. The apparatus comprises an access policy controller in communication with the access control database which implements the policies and controls access by the party to the artifacts being controlled.

The present invention pertains to a computer program embodied on a computer readable medium for controlling access rights of a party during composition, design and execution of the program. The program comprises a plurality of artifacts. At least a first of the plurality of artifacts or a part of it being modifiable by the party and operative with all other artifacts of the plurality of artifacts after being modified. Each artifact has access controlled by an access manager based on a request of the party and policies in an access control database.

The present invention pertains to a method for controlling access rights of artifacts having computer operated functions of a computer program. The method comprises the steps of requesting by a party a request to get access to the artifacts in an application development environment. There is the step of controlling access by the party to the artifacts in the application development environment with policies in an access control database by implementing the policies with an access policy controller in communication with the access control database and the application development environment.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 1:
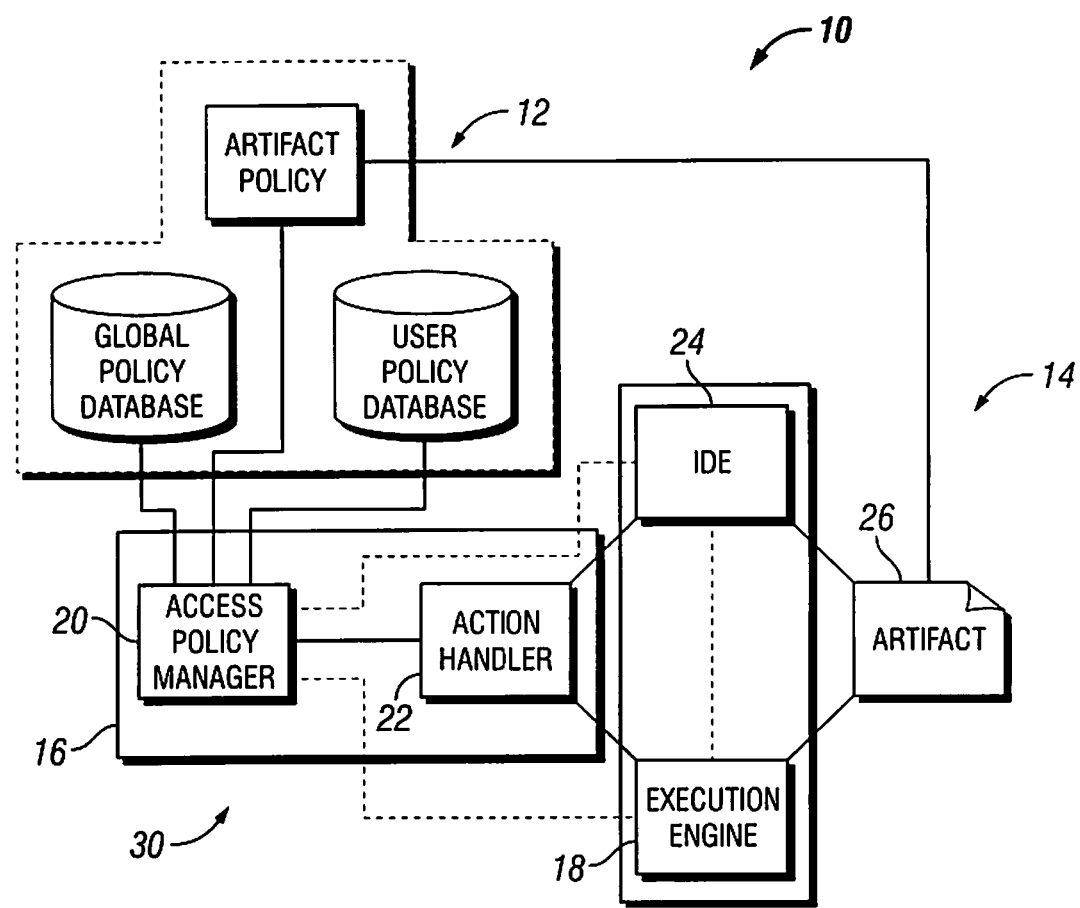
FIG. 1 is a block diagram of the system of the present invention.
Figure 2:
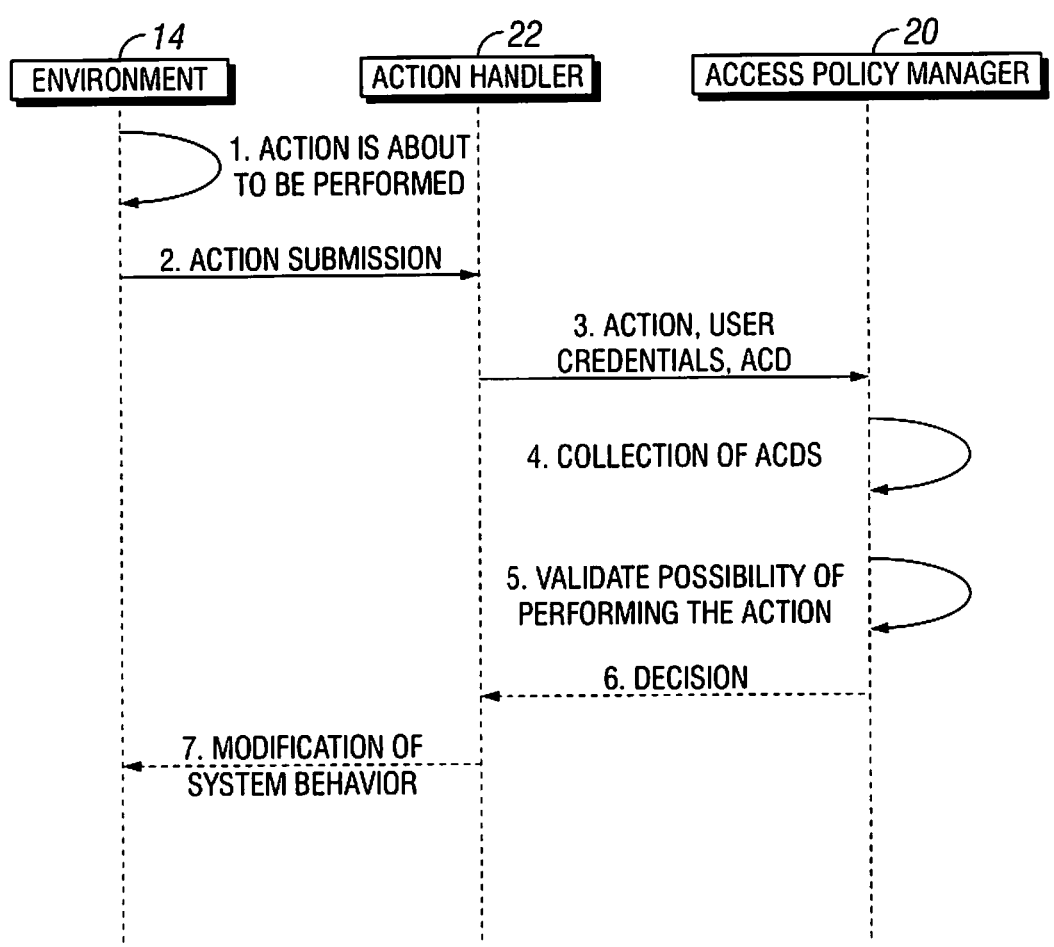
FIG. 2 is a block diagram of the system regarding its operation.

Referring now to the drawings wherein like reference numerals refer to similar or identical parts throughout the several views, and more specifically to FIGS. 1 and 2 thereof, there is shown a system 10 for controlling access rights of artifacts having computer operated functions of a computer program. The system comprises an application development environment 14 having the artifacts. The system 10 comprises an access control database 12 which has policies that control access by a party to the artifacts in the application development environment 14. The system 10 comprises an access policy controller 16 in communication with the access control database 12 and the application development environment 14 which implements the policies and controls access by the party to the artifacts being controlled.

Preferably, the environment 14 includes an execution engine 18 which executes the artifacts. The database 12 preferably includes party level policies. Preferably, the access policy controller 16 includes an access policy manager 20 which performs decisions regarding the artifacts based on a request of the party and the policies in the database 12. The controller 16 preferably includes an action handler 22 which intercepts actions performed on the artifacts by the environment 14 and propagates the actions and their associated control data to the access policy manager 20, and applies the decision made by the access policy manager 20 to the environment 14 in regard to the request of the party, the action handler 22 in communication with the access policy manager 20 and the execution engine 18.

Preferably, the environment 14 includes an IDE 24 for editing and debugging of the artifacts. The database 12 preferably includes global level policies. Preferably, each artifact includes an artifact and the database 12 includes artifact policies for accessing an artifact. The artifact preferably includes at least one of an application skeleton, BPEL, workflow definition, source code, an indicator of describing actions or a structured document. Preferably, the access control manager 20 either disallows editing of a artifact, allows only for modification of certain parts of a artifact, allows only for use of certain program language constructs in regard to a artifact, allows only certain parameters in regard to a artifact, or allows or disallows execution of at least an part of an artifact based on the artifact's subscription level or SLA.

Figure 3:
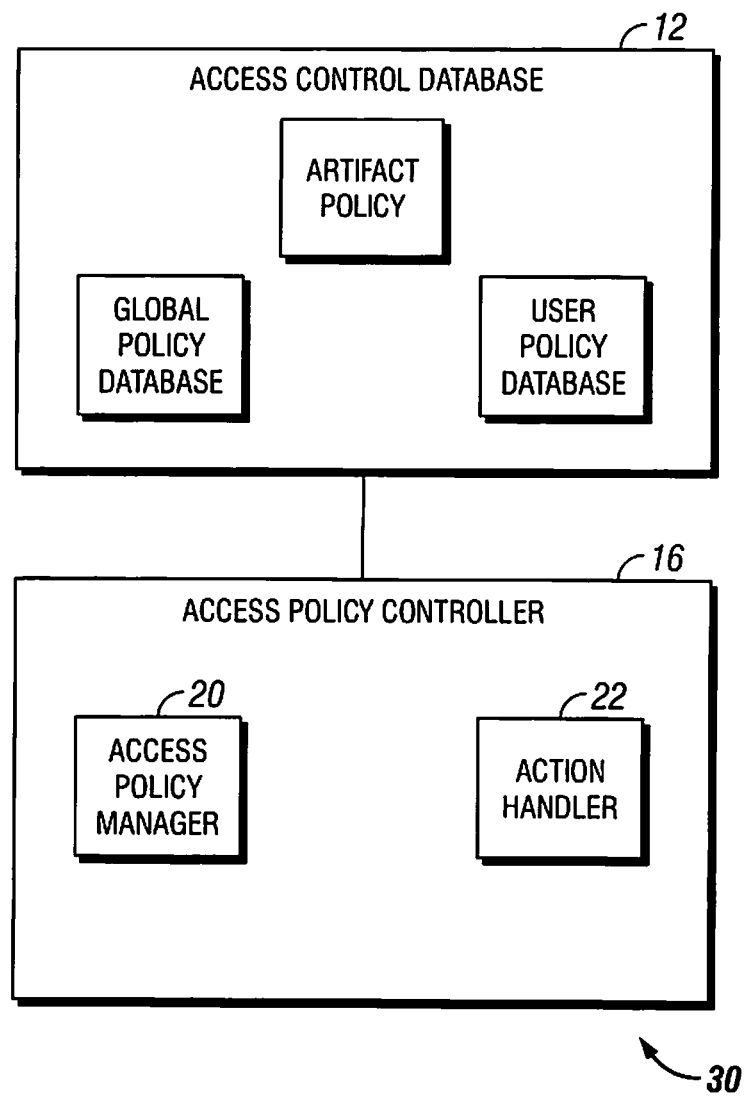
FIG. 3 is a block diagram of the apparatus of the present invention.

The present invention pertains to an apparatus 30, as shown in FIG. 3 for controlling access rights of artifacts having computer operated functions of a computer program. The apparatus 30 comprises an access control database 12 which has policies that control access by a party to the artifacts. The apparatus 30 comprises an access policy controller 16 in communication with the access control database 12 which implements the policies and controls access by the party to the artifacts being controlled. FIG. 3 further clarifies FIG. 1.

Preferably, the environment 14 includes an IDE 24 for editing and debugging of the artifacts. The database 12 preferably includes global level policies. Preferably, each artifact includes an artifact and the database 12 includes artifact policies for accessing an artifact. The artifact preferably includes at least one of an application skeleton, BPEL, workflow definition, source code, an indicator of describing actions or an structured document. Preferably, the access policy manager 20 either disallows editing of a artifact, allows only for modification of certain parts of a artifact, allows only for use of certain program language constructs in regard to a artifact, allows only certain parameters in regard to a artifact, or allows or disallows execution of at least an part of an artifact based on the artifact's subscription level or SLA.

The present invention pertains to a method for controlling access rights of artifacts having computer operated functions of a computer program. The method comprises the steps of requesting by a party a request to get access to the artifacts in an application development environment 14. There is the step of controlling access by the party to the artifacts in the application development environment 14 with policies in an access control database 12 by implementing the policies with an access policy controller 16 in communication with the access control database 12 and the application development environment 14.

Preferably, there is the step of at least one of editing, controlling, transforming and executing the artifacts with an execution engine 18 included in the environment 14. The database 12 preferably includes party level policies. Preferably, there is the step of the step of performing with an access policy manager 20 of the access policy controller 16 decisions regarding the artifacts based on the request of the party and the policies in the database 12.

There are preferably the steps of intercepting actions performed on the artifacts by the environment 14 with an action handler 22 of the controller 16, propagating with the action handler 22 the actions and their associated control data to the access policy manager 20, and applying with the action handler 22 the decision made by the access policy manager 20 to the environment 14 in regard to the request of the party. The action handler 22 is in communication with the access policy manager 20 and the execution engine 18. Preferably, there is the step of editing and debugging the artifacts with an IDE 24 of the environment 14. The database 12 preferably includes global level policies. Preferably, the action handler 22 and the access policy manager 20 are co-located or in a common unit or device.

Preferably, there is the step of accessing an part of each artifact based on artifact policies in the database 12. The artifact preferably includes at least one of an application skeleton, BPEL, workflow definition, source code, an indicator of describing actions or a structured document. Preferably, there is the step of the access control manager 20 either disallowing editing of a artifact, allowing only for modification certain parts of an artifact, allowing only for use of certain language constructs in regard to a artifact, allowing only certain parameters in regard to a artifact, or allowing or disallowing execution of at least an part of an artifact based on the subscription level or SLA.

In the operation of the invention, mechanisms are described for controlling the actions performed on an artifact or groups thereof by software, service and composite service creation and execution environments. Examples of actions controlled by access control data are adding/removing/modifying a component in a composite service, executing a service or group of services in a composite service.

Preferably, there is the step of accessing an part of each artifact based on artifact policies in the database 12. The artifact preferably includes at least one of an application skeleton, BPEL, workflow definition, source code, an indicator of describing actions or a structured document. Preferably, there is the step of the access policy manager 20 either disallowing editing of an artifact, allowing only for modification certain parts of an artifact, allowing only for use of certain language constructs in regard to a artifact, allowing only certain parameters in regard to a artifact, or allowing or disallowing execution of at least an part of an artifact based on the subscription level or SLA.

In case a system 10 involves a creation environment, the following examples are applicable:
   Attributes or parts of the artifact or interactions between artifacts that are not accessible to the developer according to the access control data may be displayed in a different way e.g. opaque, black box or not at all.

In case the system 10 involves an execution environment, the following examples are applicable:
   Access control data for execution may include alternative execution modes of artifacts
   Access control data may be defined in a mark-up language such as XACML (see below). The granularity of the control over actions that may be performed on artifact or groups thereof may depend on the domain. In the case of service composition access control data may be associated with the overall application skeleton or individual services or individual parts or skeletons.

The following describes use cases that demonstrate the different levels, different aspects of control one may have over access. These examples include:
1. Disallow editing of the skeleton
2. Allow only for modification of certain parts of skeletons
3. Allow only for use of certain language constructs or only with certain parameters
4. Allow/disallow execution of the whole skeleton or some parts of it based on the subscription level/SLA In order to support the demonstration, the policy aspect is defined. A policy aspect consists of two components the ID and the PROPERTIES component.

The ID component holds a comma separated collection of identifiers $\{I_1, I_2, I_3, \ldots I_N\}$ E CE where CE is the global collection of components. The $I_n$ can exist in two formats:

Simple format: $I_N$: Identifier of an component, e.g. CallKeeper

Extended format: In:$A_1$:$B_2$: . . . :$Z_N$: Identifier of a component and specification of sub components e.g. CallKeeper: Constraints The different formats allow control over each and every component that exists in the inventory using a simple XPATH like format.

These identifiers are used for pointing out the components that this access policy applies to. The ID component is not mandatory and its absence indicates that the policy applies to the whole component.

The properties component contains a collection of components describing the level of access one can have over the component stated with the identifier e.g.
   <edit>true</edit> receives values from a Boolean domain
   <execute>true/false</execute>.
   <action>{$expression>}</action> the evaluation of this expression determines the course of access flow 1. Disallow editing the skeleton

| | |
|---|---|
| <policy> | This policy refers to the entity |
|    <id>skeleton1</id> | "skeleton1" and completely |
|    <properties> | disallows editing. |
|    <edit>false</edit> | This policy applies to the whole |
|    </properties> | skeleton. |
| </policy> | |

2. Allow only modification of certain parts of the skeleton

| | |
|---|---|
| <skeleton> | This policy states that |
|    <id>skeleton1</id> | the only field, a party |
|    <object> | can edit is the web |
|       <id>object1</id> | service uri. |
|       <object> | Furthermore, it |
| <id>constraints</id> | explicitly states that |
|       <value>{$sum>123}</value> | the constraints of |
|       </object> | object1 cannot be |
|    </object> | edited. |
|    <object> | |
|       <id>object2</id> | |
|       <object> | |
| <id>ws-uri</id> | |
|       <value>http://ws.amazon.com/purchase.wsdl</value> | |
|       </object> | |
|    </object> | |
| </skeleton> | |
| <policy> | |
|    <id>object1:constraints</id> | |
|    <properties> | |

-continued

```
        <edit>false</edit>
    </properties>
</policy>
```

3. Allow only for use of certain language constructs or only with certain parameters (This policy refers to the aforementioned skeleton representation)

```
<policy>                          This policy states that
    <id>object1:constraints</id>  the constraints of
    <properties>                  object1 could only use
        <operands>>|              an operand such as >, =,
=|>|>=</operands>                 or >= and receive
        <values>{1,               values between 1 and
999}</values>                     999.
    </properties>
</policy>
```

This policy states that you can only choose from > or = or >= as operands and that your variable can only receive values between 1 and 999 but not 1 or 999.

4. Allow/disallow execution of the whole skeleton or some parts of it based on the subscription level/SLA

```
<policy>                                This policy checks the party's
    <id>object2:ws-uri</id>             access level and if it is greater
    <properties>                        or equal than 4 it allows the
        <allow-execution>{$access-      execution of object2:ws-uri.
level.>=4}</allow-execution>
    </properties>
</policy>
global-policy>
    <properties>
        <allow-web-service-editting>{$access-level>=4</allow-web-service-editting>
        <maximum-number-of-concurrent-executions>5</maximum-number-of-concurrent-
executions>
    </properties>
</global-policy>
```

The above is an example of a global policy. It is applicable during execution time and/or during editing time. It states that web services can only be edited by parties whose clearance is higher or equal to 4 and that the number of concurrent executions of a skeleton can only be 5.

This policy specifies that the execution engine 18 can only execute the object 2 web service if the engine's access level is higher or equal to 4.

In some situations, the vendor of the environment or its party (developer or operator) may have a need to define a generic policy that applied to all artifacts, as long as they satisfy certain constraints (e.g. when they are marked as being available for "gold" subscriptions only). These policies should be also taken into account by the environment 14. In this case, such policies are defined within the environment and not associated and distributed with the artifacts.

In order to keep the elaboration to the simplest level without harming the expressiveness of the disclosed invention, the definitions stated above are reused. A global is denoted as <global-policy> and specifies a virtual sandbox of access rights that act as boundaries during the development/editing process of the skeleton and also during the execution.

The specification of a high level architecture overview is now provided. This overview is not meant to adhere to a specific approach for the implementation of the proposed invention, but to highlight the logical entities that already exist in an application development and execution environment and complement them in order to benefit from a mechanism for access policy, as shown in FIG. 1.

Application development environment 14:
IDE: Editing/debugging environment
Execution Engine: runtime environment The IDE 24 and the Execution Engine are architecturally symmetrical, showing that the Access Policy Manager 20 affects them both.

Policy datasets (Access Control Data, ACD):
Party Policy: party level policy
Global Policy: global level policy
Artifact Policy: specific artifact policy set
Mechanism for access policy:
Action Handler 22: Mechanism for intercepting actions performed on artifacts by the environment 14 and propagating them and their access control data to the Access Policy Manager 20. Serves as intermediary between the environment 14 and the Access Policy Manager 20. After Access Policy Manager 20 makes its decision based on policies, Action Handler 22 is responsible for triggering the enforcement of the taken decision.
Access Policy Manager 20: Mechanism for doing decisions based on the captured action and ACD with satellite policy datasets (party, global, artifact). After the policy decision is taken (e.g. action is accepted, rejected or modified) the Access Policy Manager 20 dispatches the policy decision (e.g. modified action) back to the Action Handler 22.

There could be a connection between the IDE 24 and the Access Policy Manager 20, allowing a super party (in terms of clearance) of the IDE 24 to modify the Access Policy repositories.

It should be emphasized that described components (e.g. Action Handler 22 and Access Policy Manager 20) are logical components and may be part of the IDE 24 or execution engine 18 in the actual implementation. The execution engine 18 or IDE 24 can be in the control of the party or of the owner of a subject artifact. If the execution engine 18 or IDE 24 are in the control of the owner, then the party in one embodiment could communicate with them through a network. In such a case, the artifact is maintained at the location of the owner and the party remotely communicates and works on the artifact through a terminal at the party's location. If the execution engine 18 or IDE 24 are in the control of the party; and the action handler 22, the access policy manager 20 and access control database 12 are in control of the owner, then the party can communicate with these access control elements through a network that is also preferably in communication with the execution engine 18 or IDE 24. In such a case, the party works on the artifact at its location, but receives the access control decisions remotely. In another embodiment, the access control components are provided with the artifact to the party who is also in control of the execution engine 18 or the IDE 24. In such a case, no further communication with the owner is typically necessary for the party to work on the artifact, since all aspects of the access control, and the artifact are at the location of the party.

The access control algorithm is now described with reference to FIG. 2.

Global Input:

A description of the action to be applied to an artifact or a set of artifacts.

Goal:

This algorithm modifies the behaviour of the environment 14 (e.g. an IDE 24 or an execution engine 18) when it tries to perform an action over an artifact. The algorithm works according to the access control data (ACD) related (e.g. attached or included) to the artifact and applicable to the action to be performed. The algorithm may take into account the party's credentials.

Global Output:

Algorithm triggers modifications of environment behavior (which may include changing the mode of execution of the input action or substituting the input action by other actions) that is going to be applied on an artifact or a set of artifacts.

Prerequisite:

In order for this algorithm to be applicable to an environment 14 a certain prerequisite must be met: The environment 14 should be designed in such a way that it always intercepts any given action to be performed on any artifact of interest, so that the policy evaluation may be applied to the action and eventually affect the default behaviour of the environment 14 when executing this action.

1. The environment 14 (e.g. an IDE 24 or an execution engine 18) is about to perform an action A on the artifact S (or set of artifacts) on behalf of a party with credentials UC. Comment: This step is not an actual step of the algorithm; it is a prelude that prepares the concept of intercepting an action. However, it is important to state this step since it is the starting point of the algorithm.
2. The environment 14 intercepts the action A, artifact S and party credentials UC and submits them to the ActionHandler. The ActionHandler's responsibility is to check if the execution of action A should be affected in any form according to access control policies. Output [A,S,UC]
3. Input [A,S,UC] The ActionHandler correlates the action A with access control data P related to artifact S (e.g. attached or included into S, see Claim 1). Action A, Artifact S, Party Credentials UC and Access Control Data ACD are transmitted towards the AccessPolicyManager. Output [A, S, UC, ACD]
4. Input [A,S,UC,ACD] The AccessPolicyManager collects all other supporting ACDs that may be applicable to action A and artifact S. Collecting of policies may, in one embodiment, include only the set of ACDs attached to the artifact. Another embodiment may additionally include global and party-specific ACDs. Output [A,S, UC,ACD$_N$]
5. Input [A,SUC,ACD$_N$] AccessPolicyManager validates the possibility of performing action A on artifact S. This is done using action data, collected set of ACDs called ACDn. It may also take into account the party credentials UC (see claim 5). As a result of this validation, a decision is made. The decision made by this check determines in what way to modify the system's behaviour, ergo it is not a binary yes or no, it is a set of quantities where each quantity determines to which degree it should affect each original component of the action. Output [Decision]
6. The decision is sent from AccessPolicyManager to the ActionHandler. Output [Decision]
7. Input [Decision] The ActionHandler triggers the enforcement of the taken decision, which may modify systems behavior, and affect the action's application on the artifact or on a set of artifacts. (see Claim 6). Output [modifications of environment 14 behaviour triggered]

Example

The following example is about the application of the algorithm to the second policy example mentioned above.

Suppose that an execution engine 18 is about to perform an action regarding the invocation of a Web Service. Before the action is performed, it is intercepted [Step 2] and it is taken into the ActionHandler, accompanied by its supporting information such as the artifact and the party's credentials. The ActionHandler checks [Step 3] the artifact and any other references for the Action Control Data. This is a preliminary step that starts building up the collection of Action Control Data related to the intercepted action. Then the action is send to the AccessPolicyManager which is responsible for collecting any other Access Control Data related to that action by taking into account Global Policies, Party Policies etc. [Step 4]. After the collection of ALL related Action Control Data is complete, a decision is made on which portions of the original action and how will they be affected according to the policies mandated by the accumulated Action Control Data [Step 5]. The decision is send back to the AccessHandler [Step 6]. The AccessHandler triggers the enforcement of this decision and the action gets modified before it is actually performed. The call will then either be made (eventually with unchanged parameters), or the call will be prohibited, or the call will be made with modified parameters.

Creation environments need to be extended to include mechanisms that take access control data into account and enforce them. Such may include:

Not allowing certain actions to be performed on a given artifact (or groups thereof) by the developer, or specific developers Disallowing use of certain composition language constructs Not providing any GUI components for performing certain actions on the artifact Not showing certain parts of artifacts definitions even in the editing mode or showing them as "black boxes", i.e. not revealing how they are defined.

Allowing editing/modification only of certain parts of the artifact.

Execution environments should take generic and artifact specific access control data into account and enforce them. The resulting change in the behaviour of the execution environment may include:

Refusing to execute artifact definitions or some parts of it (e.g. by aborting the execution or throwing an exception)

Changing the way how the artifact is executed, depending on the access control data. For example, the policy may dictate that all encrypted parts of the artifact should be treated as non-existing. Or a policy could say that the evaluation of certain constructs (e.g. selection of services according to certain constraints, as defined in the artifact) should be done only in the restricted mode (e.g. not all constructs are allowed; only a certain amount of construct uses inside the artifact is possible—at max 10 invocations per minute or at most 5 branching points).

The described approach can be applied not only to the creation and execution environments for composite services, but to other kinds of artifacts, e.g. source code editing and execution systems for (interpreted) programming languages, document processing systems, etc.

ADVANTAGES OF THE INVENTION

Creators of composite services can distribute the definitions of their services, while still being able to control what can be done with these definitions. Among other things, the following can be enforced:

Customers cannot read certain parts of definitions
Customers cannot edit certain parts of definitions
Customers cannot execute certain parts of definitions or can executed them only in a limited way All-together these features can be used to provide the ability to distribute definitions of service compositions while still ensuring a stability and correctness during the execution of compositions in customer environments, because compositions are not modified and behave as originally described by the creator of the composition. Additionally, the IP (intellectual property) of the composition creator is preserved, as some parts of the definitions are hidden from the customer and there is no easy way get access to it by other means.

This invention does not cover only service compositions as proposed in the multi-service architecture (MSA), but may be also applied to the existing and well established service orchestration like BPEL-editors and BPEL execution engines, by extending them for supporting the proposed functionality.

In XACML a policy file consists of subject, objects, actions and conditions.

A subject is defined by a <uid, role-set, group-set> and semantically it represents the party.

An object is an XPath expression that points to an part.

An action describes the type of access over an part. The type of access can be read, write, create or delete and is accompanied by grant or deny.

A condition is a Boolean formula that acts as a guard of an action. The condition's evaluation determines if the action is triggered or not. A condition can be a predicate or a function and may also contain parameters.

The predicate represents a Boolean function such as compareStr, compareInt, compareDate.

The function can be a getUid, getRole, getValue, getDate and returns a set of nodes.

Finally, the policy file itself consists of multiple <xacl> components that consist of <rule> components. <rule> components consist of <acl> componets>.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

ABBREVIATIONS

BPEL—Business Process Execution Language
AOP—Aspect Oriented Programming
JVM—Java Virtual Machine
SLA—Service Level Agreement
IDE—Integrated Desktop Environment
XACML—eXtensible Access Control Markup Language
GUI—Graphical User Interface
ACD—Access Control Data

REFERENCES

The following list of references are applicable to corresponding terms herein, and are incorporated by reference herein.

[XACML] Hada, Satoshi and Kudo, Michiharu (Oct. 16, 2000). "XML Access Control Language: Provisional Authorization for XML Documents". Tokyo Research Laboratory, IBM Research. Retrieved on Jun. 8, 2008.
[BPEL] Tony Andrews et. Al, Business Process Execution Language for Web Services version 1.1-5 May 2003
[AOP] Kiczales, Gregor; John Lamping, Anurag Mendhekar, Chris Maeda, Cristina Lopes, Jean-Marc Loingtier, and John Irwin (1997). "Aspect-Oriented Programming", Proceedings of the European Conference on Object-Oriented Programming, vol. 1241, pp. 220-242
[JVM] Tim Lindholm, Frank Yellin—The Java™ Virtual Machine Specification, Second Edition
[SLA] Heiko Ludwig et. al, Web Service Level Agreement (WSLA) Language Specification, 2001
[IDE] [Nourie] (Mar. 24, 2005). "Getting Started with an Integrated Development Environment". Sun Microsystems, Inc. Retrieved on Sep. 9, 2008.
[XPATH] James Clark, Steve DerRose, XML Path Language (XPath) Version 1.0, W3C Recommendation—16 Nov. 1999

The invention claimed is:

1. A system for controlling access rights of a software developer party with respect to artifacts having computer operated functions of a computer program, the system comprising:

an application development environment having the artifacts, at least one of the artifacts being sold by a vendor party to the software developer party;
an access control database which has policies, defined by the vendor party, that control access by the software developer party to the at least one artifact in the application development environment; and
an access policy controller in communication with the access control database to implement the policies that control access by the software developer party to the at least one artifact,
wherein the policies control access to the at least one artifact based on a subscription level of the software developer party, and
wherein the policies include a global policy that applies to all the artifacts in the application development environment and an artifact-specific policy that applies to at least a portion of a single one of the artifacts sold by the vendor party to the software developer party.

2. The system as described in claim 1 wherein the application development environment includes an execution engine which performs certain computer functions based upon actions definitions described by the artifact.

3. The system as described in claim 2 where the access control database includes party level policies.

4. The system as described in claim 3 wherein the access policy controller includes an access policy manager which performs decisions regarding the artifacts or parts thereof based on a request of the party and the policies in the access control database.

5. The system as described in claim 4 wherein the access policy controller includes an action handler which intercepts actions performed on the artifacts by the application development environment and propagates the actions and their associated control data to the access policy manager, and applies a decision made by the access policy manager to the environment in regard to the request of the party, the action handler in communication with the access policy manager and the execution engine.

6. The system as described in claim 5 wherein the application development environment includes an Integrated Desktop Environment (IDE) for editing and debugging of the artifacts.

7. The system as described in claim 6 wherein the access control database includes global level policies.

8. The system as described in claim 7 wherein the access control database includes artifact policies for accessing an artifact or parts thereof.

9. The system as described in claim 8 wherein the artifact includes at least one of an application skeleton, Business Process Execution Language (BPEL), workflow definition, source code or an indicator of describing actions to be performed or a structured document.

10. An apparatus for controlling access rights of a software developer party with respect to artifacts having computer operated functions of a computer program, the apparatus comprising:
   an access control database which has policies that control access by the software developer party to at least one of the artifacts in an application development environment, the policies being defined by a vendor party of the at least one artifact; and
   an access policy controller in communication with the access control database to implement the policies that control access by the software developer party to the at least one artifact,
   wherein the policies control access to the at least one artifact based on a subscription level of the software developer party, and
   wherein the policies include a global policy that applies to all the artifacts in the application development environment and an artifact-specific policy that applies to at least a portion of a single one of the artifacts sold by the vendor party to the software developer party.

11. A method for controlling access rights of a software developer party with respect to artifacts having computer operated functions of a computer program, the method comprising the steps of:
   requesting, by the software developer party, to perform an action on at least one of the artifacts in an application development environment; and
   using an access policy controller, in communication with an access control database to implement policies stored in the access control database and defined by a vendor party of the at least one artifact, to control access by the software developer party to the at least one artifact,
   wherein the policies control access to the at least one artifact based on a subscription level of the software developer party, and
   wherein the policies include a global policy that applies to all the artifacts in the application development environment and an artifact-specific policy that applies to at least a portion of a single one of the artifacts sold by the vendor party to the software developer party.

12. The method as described in claim 11 including the step of at least one of editing, controlling, transforming and executing the artifacts with an execution engine included in the application development environment.

13. The method as described in claim 12 wherein the access control database includes party level policies.

14. The method as described in claim 13 including the step of performing decisions regarding the artifacts based on the request of the party and the policies in the access control database with an access policy manager of the access policy controller.

15. The method as described in claim 14 including the steps of intercepting actions performed on the artifacts by the environment with an action handler of the access policy controller, propagating with the action handler the actions and their associated control data to the access policy manager, and applying with the action handler a decision made by the access policy manager to the application development environment in regard to the actions requested by the party, the action handler in communication with the access policy manager and an execution engine.

16. The method as described in claim 15 including the step of editing and debugging the artifacts with an Integrated Desktop Environment (IDE) of the application development environment.

17. The method as described in claim 16 wherein the access control database includes global level policies.

18. The method as described in claim 17 including the step of accessing an artifact or parts thereof based on artifact policies in the access control database.

19. The method as described in claim 18 wherein the artifact includes at least one of an application skeleton, Business Process Execution Language (BPEL), workflow definition, source code or an indicator of describing actions to be performed or a structured document.

* * * * *

UNITED STATES PATENT AND TRADEMARK OFFICE
CERTIFICATE OF CORRECTION

PATENT NO. : 9,111,108 B2  
APPLICATION NO. : 12/249313  
DATED : August 18, 2015  
INVENTOR(S) : Levenshteyn et al.

Page 1 of 2

It is certified that error appears in the above-identified patent and that said Letters Patent is hereby corrected as shown below:

In the Specification

In Column 4, Line 27, delete "control" and insert -- policy --, therefor.

In Column 4, Lines 43-56, delete "Preferably, the environment 14 includes an IDE 24 for editing and debugging of the artifacts. The database 12 preferably includes global level policies. Preferably, each artifact includes an artifact and the database 12 includes artifact policies for accessing an artifact. The artifact preferably includes at least one of an application skeleton, BPEL, workflow definition, source code, an indicator of describing actions or an structured document. Preferably, the access policy manager 20 either disallows editing of a artifact, allows only for modification of certain parts of a artifact, allows only for use of certain program language constructs in regard to a artifact, allows only certain parameters in regard to a artifact, or allows or disallows execution of at least an part of an artifact based on the artifact's subscription level or SLA." and insert -- The present invention pertains to a computer program embodied on a computer readable medium for controlling access rights of a party during composition, design and execution. The program comprises a plurality of artifacts. At least a first of the plurality of artifacts having a part being modifiable by the party and operative with all other artifacts of the plurality of artifacts after being modified. Each artifact has access controlled by an access manager based on a request of the party and policies in an access control database. --, therefor.

In Column 5, Line 28, delete "control" and insert -- policy --, therefor.

In Column 5, Lines 42-53, delete "Preferably, there is the step of accessing an part of each artifact based on artifact policies in the database 12. The artifact preferably includes at least one of an application skeleton, BPEL, workflow definition, source code, an indicator of describing actions or a structured document. Preferably, there is the step of the access policy manager 20 either disallowing editing of an artifact, allowing only for modification certain parts of an artifact, allowing only for use of certain language constructs in regard to a artifact, allowing only certain parameters in regard to a artifact, or allowing or disallowing execution of at least an part of an artifact based on the subscription Signed and Sealed this  
Nineteenth Day of April, 2016

Michelle K. Lee  
*Director of the United States Patent and Trademark Office*

CERTIFICATE OF CORRECTION (continued)
U.S. Pat. No. 9,111,108 B2 level or SLA." and insert -- This control is achieved by defining and enforcing access control data associated with artifacts. Use of the artifact (execution and creation/modification) individually or as part of a group is prohibited if not all the conditions defined by the access control data are fulfilled. --, therefor.

In the Claims

In Column 12, Line 58, in Claim 3, delete "where" and insert -- wherein --, therefor.